UNITED STATES PATENT OFFICE.

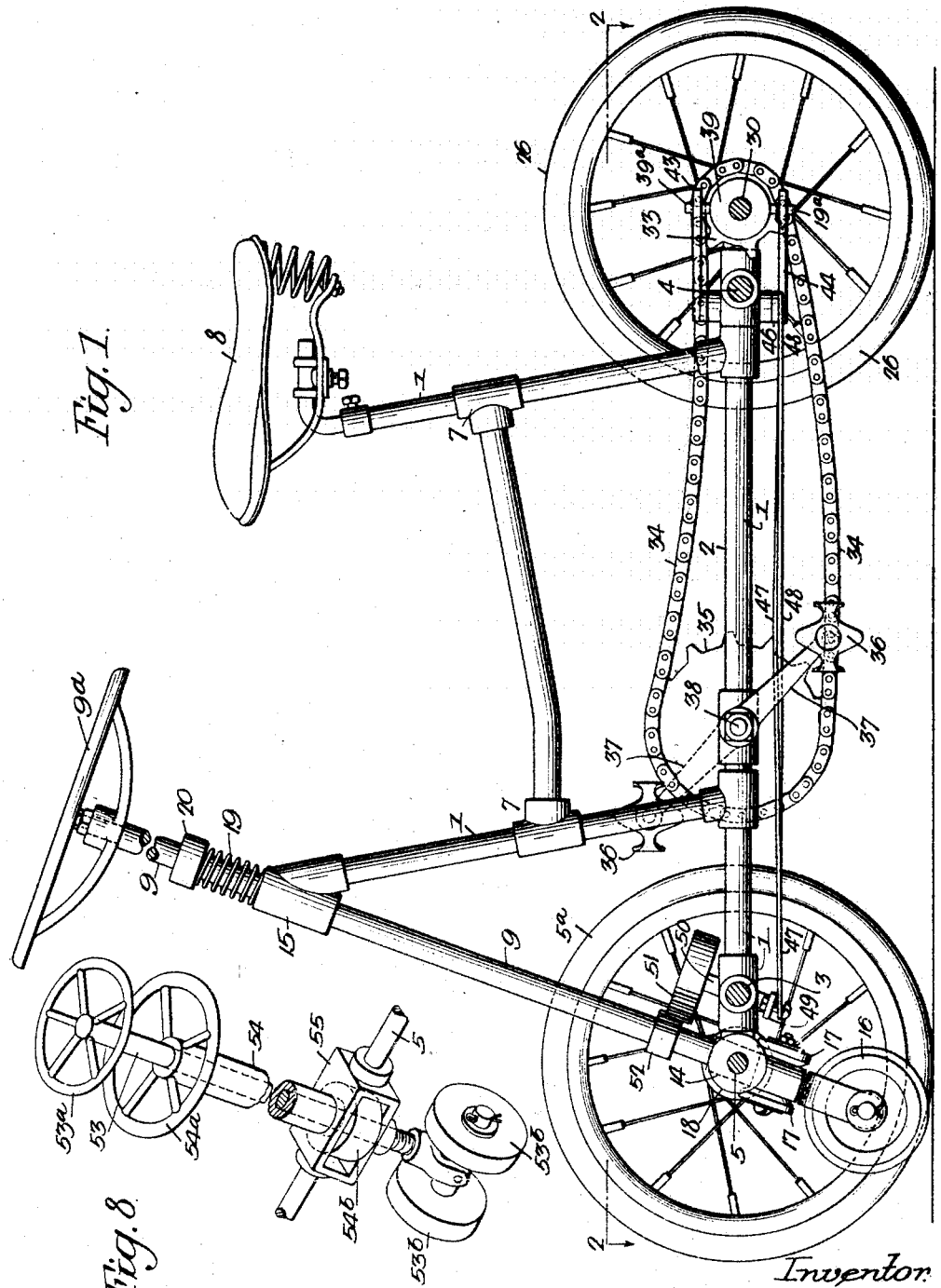

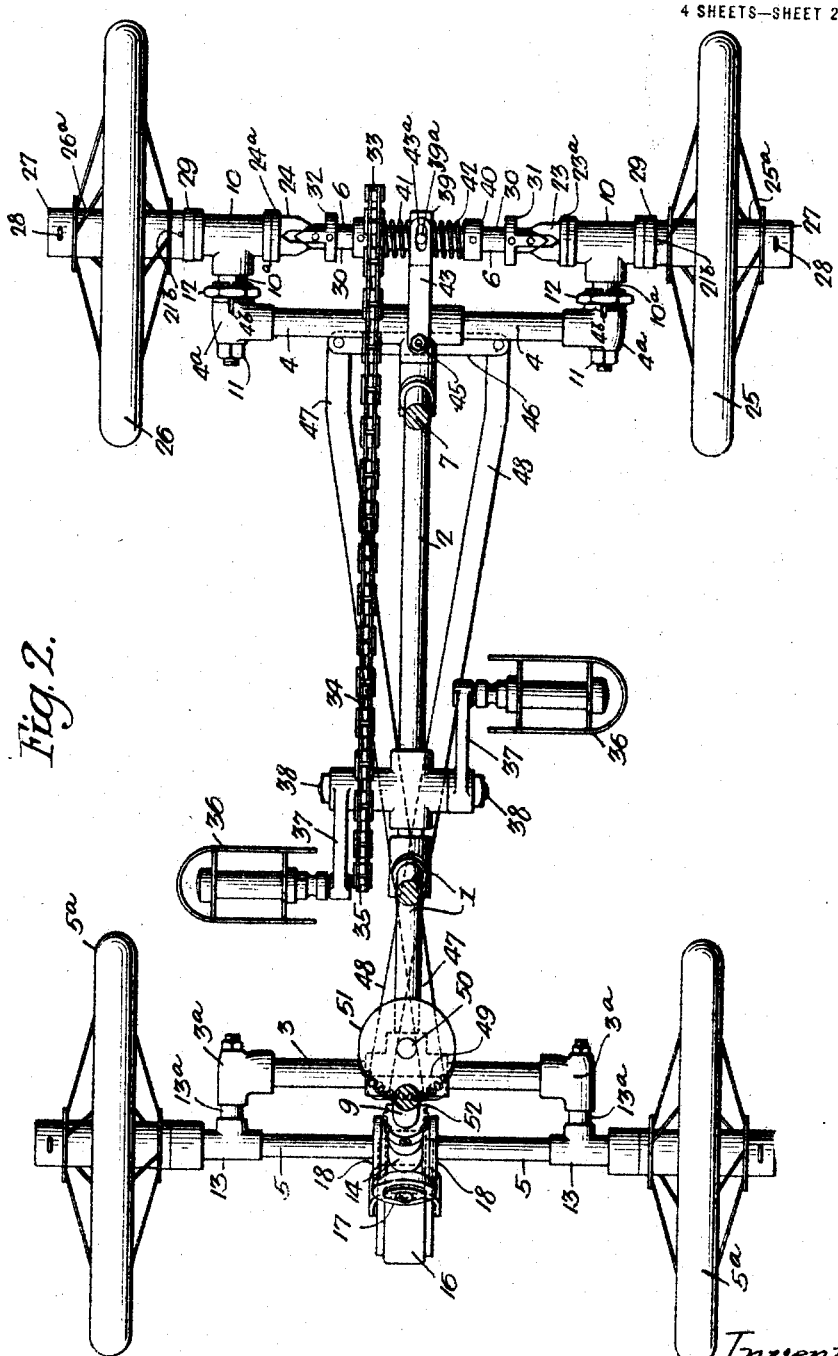

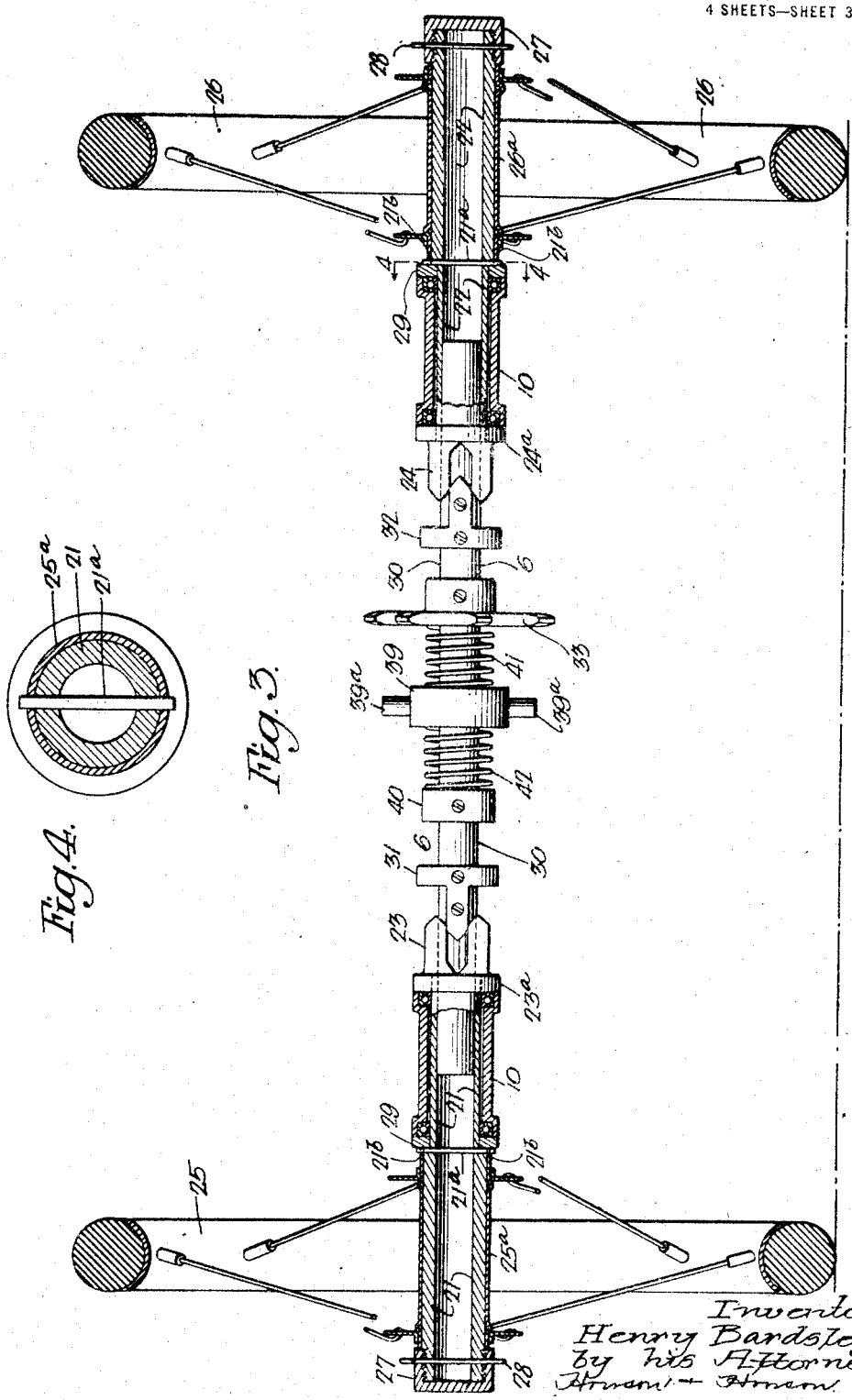

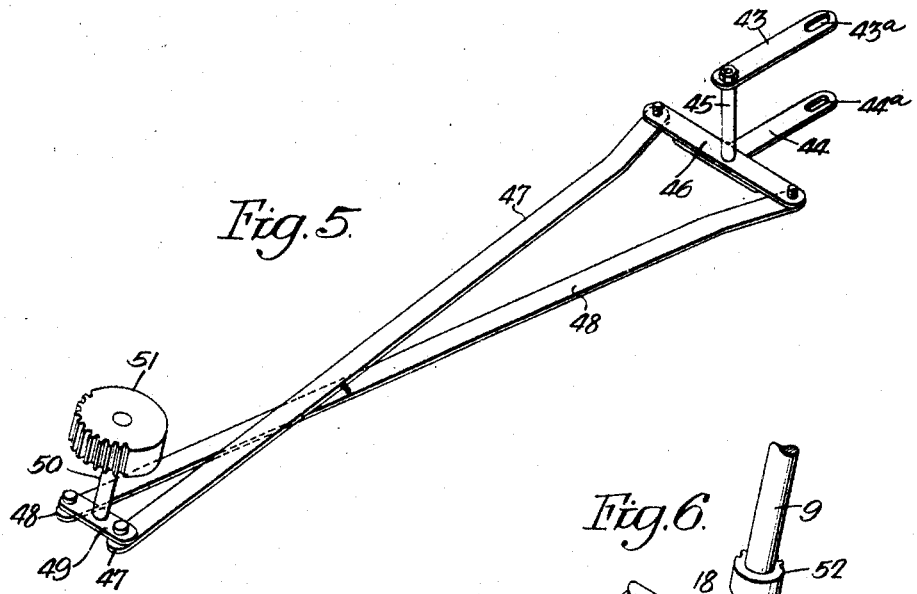
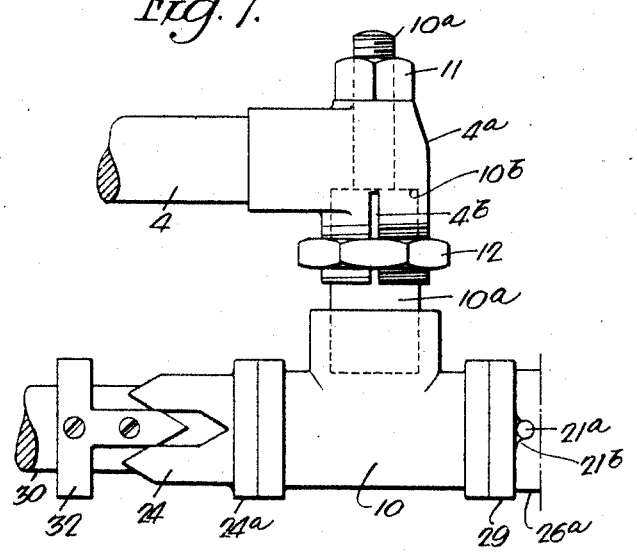

HENRY BARDSLEY, OF PHILADELPHIA, PENNSYLVANIA.

STEERING DEVICE.

1,366,154. Specification of Letters Patent. Patented Jan. 18, 1921.

Application filed January 17, 1920. Serial No. 352,185.

*To all whom it may concern:*

Be it known that I, HENRY BARDSLEY, a citizen of the United States, residing in Philadelphia, Pennsylvania, have invented certain Improvements in Steering Devices, of which the following is a specification.

My invention relates to vehicles, and more particularly to steering devices therefor; the object of my invention being to provide a novel steering device whereby vehicles, and particularly vehicles having four supporting wheels, may be directed in the desired course with great facility, and by means of which complete turns may be negotiated in extremely restricted spaces without the trouble usually attendant such turns with the present forms of steering apparatus.

In the attached drawings:

Figure 1, is a vertical section of a velocipede illustrating one application of my invention;

Fig. 2, is a horizontal section of the velocipede taken on the line 2—2, Fig. 1;

Fig. 3, is a vertical section of the rear axle of the velocipede illustrating the details of the differential or clutch mechanism;

Fig. 4, is a section of the rear axle taken on the line 4—4, Fig. 3;

Figs. 5 and 6, are detached perspective views of certain details of the mechanism;

Fig. 7, is a plan view showing the details of the rear axle adjusting means; and Fig. 8, is a view in perspective of a modification of the steering mechanism.

With reference to the drawings, 1 is the framework of a velocipede, made in the present instance of metal tubing, said frame consisting, in the present instance, of a central longitudinal bar 2, having cross pieces 3 and 4 at the ends thereof, which carry the front and rear axles 5 and 6, respectively, and a superstructure 7, mounted upon the bar 2, which carries the seat 8 and which provides a support for the steering rod 9, all as clearly indicated in Figs. 1 and 2.

At each extremity of the cross piece 4, is a journal box 10, which journals hold the rear axle 6. The manner in which the said journal boxes 10 are secured to the cross piece 4 is clearly shown in Fig. 7. A socket member $4^a$, secured one at each end of the cross piece 4 is adapted to receive an extension $10^a$ carried by the journal boxes 10, the said extensions having shoulders $10^b$ which abut corresponding shoulders in the members $4^a$, and the outer extremity of the said extensions $10^a$ which extend completely through the respective members $4^a$ are threaded to receive nuts 11 whereby the said extensions may be held firmly within the said members $4^a$. In order, however, that there may be provided means for adjusting the rear axle to and from the frame of the machine, the members $4^a$ into which the extensions $10^a$ upon the respective journal boxes extend are split at $4^b$, and are externally threaded and slightly tapered so that when the nuts 12 are moved inwardly on the members, they have the effect of drawing the two sides of the split portions together so that they embrace the extensions $10^a$ firmly and retain them in whatever positions within the members $4^a$ that may be found desirable. The nuts 11 may be loosened or tightened to accord with the new position of the extensions $10^a$ in the fittings.

At each extremity of the cross piece 3 is a socket member $3^a$, in each of which is established an extension $13^a$ upon a journal box 13. In the journal boxes 13, 13 is carried the front axle 5. The members $3^a$ and the extensions $13^a$ are in all respects similar to the members $4^a$ and extensions $10^a$ at the rear of the vehicle, with the exception that no provision is made in the members $3^a$ for adjustment of the forward axle.

At the center of the front axle is a journal 14, in which is mounted the steering rod 9, said rod also being held in a journal 15 upon the superstructure of the frame. The steering rod 9 carries upon its lower extremity a steering wheel 16, and located upon the said steering rod at a point above the steering wheel 16 are two small wheels or rollers 17 disposed, in the present instance, at front and rear and parallel to each other. These wheels or rollers 17 are adapted to engage a corresponding set of wheels or rollers 18 carried by the front axle 5, as clearly shown in Fig. 6. The wheels 17 and 18 are in each case free to revolve upon their respective mountings. The steering rod 9 is adapted to move longitudinally in the journals 14 and 15, and a spring 19 interposed between the said journal 15 and a collar 20 secured to the rod 9 tends to retain the steering rod in the normal elevated position, which is shown in Fig. 1. It will now be apparent that, the two pairs of engaging rollers being equal distances apart, any rotation of the rod 9 will cause a riding over the fixed wheels or rollers 18 of the wheels or rollers 17 carried by the said steering rod whereby the steering rod will be forced downwardly in its journals until the wheel 16 comes in contact with the surface upon which the vehicle rests; and if the rod is still further rotated after the wheel 16 contacts with the ground, the natural result will be the elevating of the front axle 5 and of the two front wheels $5^a$, $5^a$, and, in fact, the entire front of the frame, so that the said machine will be supported entirely upon the two rear wheels and the small steering wheel 16 at the front, the course of the machine being governed entirely by the angular position of the said wheel 16 relative to the center bar 2 or the long axis of the machine.

When the rod 9 is rotated to the position in which the wheel 16 lies in line with the center rod 2, the front wheels of the velocipede will again be brought into contact with the ground. The adjustment may be such that the steering wheel 16 lies in contact with the supporting surface when the steering rod is in the normal elevated position, or, as shown in Fig. 1, the said steering wheel may be in the normal position slightly above the ground surface. In either case, the turning of the steering wheel $9^a$ results in the elevation of the front wheels from the ground, and the conversion for the time of the four-wheeled vehicle into a three-wheeled vehicle; the course of the machine being controlled by the single steering wheel at the front of the machine.

The advantages of this device lie chiefly in the ability of the operator to turn the vehicle around in the least possible space, danger of upsetting in a quick short turn being minimized, if not entirely eliminated; and whereas in the present vehicle this particularly advantageous feature of the tricycle is obtained, advantage is also had of the greater stability and strength of the four-wheeled vehicle.

The details of the rear axle are most clearly shown in Fig. 3. Mounted in each of the journals 10 is a hollow open-ended shaft, 21 and 22. Suitably attached to the inner end of each of the shafts 21 and 22 is a hollow clutch member 23 and 24, respectively, said clutch members 23 and 24 having flanges $23^a$ and $24^a$ which abut the sides of the respective journals 10. The shafts 21 and 22 carry upon the outer extremities the two rear wheels 25 and 26, said wheels being held upon the shafts by means of hub caps 27 which are screwed upon the extremities of the shafts and which are held thereon by means of pins or the like 28. Extending through the shafts 21 and 22 at a point near the journals 10 are pins $21^a$, said pins extending beyond the outer surface of the shafts 21, and notches $21^b$ formed in the hubs $25^a$ and $26^a$ of the wheels are adapted to receive the said pins to prevent the wheels turning upon the shafts, the details of this construction being clearly shown in Fig. 4. Interposed between the pins $21^a$ and the outer ends of the journals 10, are washers 29.

Extending between the two hollow shafts 21 and 22 is a movable power shaft 30, the extremities of which enter the said hollow shafts, as shown in Fig. 3. Carried upon the shaft 30 and secured thereto are clutch members 31 and 32, which are adapted, respectively, to engage the clutch members 23 and 24 upon the hollow shafts 21 and 22, said members having interlocking fingers, as clearly illustrated. Secured also to the shaft 30 is a sprocket wheel 33, said sprocket wheel being connected by means of a sprocket chain 34 with a sprocket 35 mounted upon the center bar 2 of the frame, and adapted to be rotated by means of pedals 36 carried at the outer extremities of cranks 37 upon a shaft 38 to which the sprocket 35 is secured. A central collar 39 is loosely mounted upon the axle 6, and interposed between the collar 39 and the sprocket wheel 33 on one side and a fixed collar 40 on the other side are springs 41 and 42. The shaft 30 normally lies in the position shown in Fig. 3, and the power is accordingly transmitted evenly and equally to both the rear wheels.

From the foregoing description of the rear axle, it will be plain that the movable shaft 30 is capable of being moved either to the right or left in the hollow shafts 21 and 22, and such movement to the right or left is calculated to draw out of engagement with the interlocking member one or other of the clutch members 31 and 32 whereby one of the hollow shafts 21 or 22 is left free to revolve in its journal independently of the shaft 30. This lateral shifting of the shaft 30 is accomplished in the present instance by means of a link mechanism, most clearly shown in perspective in Fig. 5, which comprises the two arms 43 and 44, which extend one above and one below the collar 39, and which are slotted at $43^a$ and $44^a$, respectively, to receive the pins $39^a$ which extend from the periphery of the said collar 39. The arms 43 and 44 are carried upon opposite ends of a pin 45, which is mounted in a journal upon the rear cross piece 4. A compound lever arm 46 is secured, in the present instance, to the lower extremity of the said pin 45, and connecting rods 47 and 48 extend one from each end of the lever arm 46 to a corresponding though smaller lever arm 49 attached to a pin 50 journaled in the front cross piece 3. At the upper extremity of the pin 50 is carried a segmental gear element 51, which meshes with a gear element 52 carried by the steering rod 9, as most clearly shown in Fig. 1. In this manner, rotary motion of the steering rod 9 is transmitted to the pin 45 at the rear and to the two arms 43 and 44, and the loose collar 39 receives from the arms 43 and 44 a lateral movement, one way or the other, which lateral movement is in turn transmitted through one or other of the springs 41 or 42 to the movable shaft 30 whereby the interengaging clutch elements at one side or the other are released from engagement and the corresponding rear wheel left free to revolve independently.

The connecting rods 47 and 48 are crossed, as clearly shown in Fig. 5, so that movement of the steering rod 9 in a clockwise direction to steer the vehicle to the right will effect the release of the right rear wheel, and motion of the steering rod 9 in a counterclockwise direction will correspondingly effect a release of the left rear wheel from the driving mechanism and permit the independent rotation of the said wheel and of the shaft 21 which carries it.

In case the shaft 30 becomes locked in any manner, or its free motion to the right or left is impeded, as might for instance be the case should the clutch members fail to register and intermesh properly, the steering gear is still free to operate, since the motion of the steering rod 9 will be taken up by the springs 41 and 42 upon the rear axle, and it is for this purpose that provision is made for free motion of the collar 39 with respect to the shaft 30.

It will, of course, be understood that the mechanism herein described is capable in its broad aspect of numerous applications, and is not confined to the particular application hereindescribed. It is also to be understood that the details of the construction are capable of many changes and modifications to suit existing conditions, with no departure from the essential features of the invention. It is possible for instance to substitute two opposed cams for the pairs of rollers 17 and 18. It is also apparent that the principle involved in this method of steering may find application to other than wheeled vehicles, as for instance sleds, in which case instead of the steering wheels, a steering runner might be employed, and substantially the same mechanism for forcing the said steering runner downwardly against the surface of the snow or ice. The forward portion of the sled could thus be elevated and the sled turned in a much shorter space than is possible with the ordinary form of steering mechanism.

I further desire it understood that the invention is considered to extend to any means for elevating a portion of a vehicle to bring into play a steering member, such as a wheel or runner, for guiding the said vehicle in a desired course; and the mechanism for elevating the said vehicle in order to bring the said steering member into position for directing the course of the vehicle may be entirely independent of the means for manipulating the said steering member to direct the course of the vehicle; and the actual manipulation of the steering member in steering the vehicle may occur after and entirely independent of the elevation operation. Thus, although in the present embodiment I have shown mechanism whereby the turning of the steering wheel to change the direction of the vehicle's travel automatically brings the wheel into engagement with the ground and elevates the fore wheels of the vehicle, it is apparent that substantially the same result may be obtained by providing a mechanism for bringing the steering wheel into engagement with the ground and for elevating the forward portion of the vehicle which is independent of the mechanism for turning the steering wheel to direct the vehicle's course. Such a device I have illustrated in Fig. 8, which shows a steering rod 53 having an operating wheel 53ª at the top thereof, said steering rod being threaded in part and being mounted within a hollow spindle 54 journaled in the front axle 55 of a vehicle not shown. The hollow spindle 54 is adapted to turn freely in the box journal 55 carried by the axle, but is prohibited from longitudinal movement by the flanged portion 54ᵇ which is established between the sides of the said box journal 55. The interior of the flanged portion 54ᵇ is threaded to engage the threads upon the rod 53. An operating wheel 54ª is attached to the upper end of the spindle 54, and it will be apparent that when the said spindle is rotated, the rod 53, carrying the compound steering wheel 53ᵇ upon the lower extremity, is moved up or down, as the case may be, within the spindle.

In operation, when it is desired to turn the vehicle to which this device is attached, the operating wheel 54ª is first manipulated to force the steering member 53ᵇ downwardly against the ground and thus to elevate the fore wheels of the vehicle above the ground, and this being accomplished, the wheel 53ª is manipulated to guide the vehicle as desired.

This modification may find its best application in connection with the ordinary motor vehicle, in which it could be employed as an auxiliary steering device for turning the vehicle in restricted spaces.

It is obvious that these devices may be placed either at the front or rear of a vehicle, but since in the ordinary wheeled vehicle the driving wheels are at the rear and the steering gear at the front, I have described the device in connection with a vehicle of this type. Where the device is applied to sleds or the like, it may be placed either at the front or rear, as desired, since it is only necessary to elevate one end of the vehicle upon the steering member to obtain the desired steering effect.

I claim:

1. In a vehicle, the combination with a steering member adapted to operate in conjunction with the ground to guide the vehicle, of means normally retaining said member in an inoperative position, means for manipulating the member to guide the vehicle, and mechanism actuated by means of said manipulating means for rendering the member operative.

2. In a vehicle, the combination with a member adapted to operate in conjunction with the ground to guide the vehicle, said steering member being normally in an inoperative position, of means for elevating one end of the vehicle and for supporting said elevated end upon the steering member, and means for manipulating the member to guide the vehicle.

3. In a vehicle, the combination with a frame and means normally supporting same, of a steering member mounted in said frame and adapted to operate in conjunction with the ground to guide the vehicle, means normally retaining the steering member in an inoperative position, means for elevating one end of the frame and for supporting said end upon the steering member, and means for manipulating the steering member to guide the vehicle.

4. In a vehicle, the combination with a frame having a plurality of wheels normally supporting the same, of a steering wheel mounted in the frame and normally retained in an inoperative position, means for elevating the wheels supporting one end of the frame and for supporting said end upon the steering wheel, and means for manipulating the steering wheel to guide the vehicle.

5. In a vehicle, the combination with a frame, of a steering member mounted therein and adapted to operate in conjunction with the ground to guide the vehicle, means for turning said member to guide the vehicle in the course desired, and means operable in conjunction with said turning means for bringing the weight of one end of said frame to bear upon the steering member as it is turned.

6. In a vehicle, the combination with a frame supported at each end by a plurality of wheels, of a steering wheel mounted in said frame and normally held in an inoperative position, means for turning said steering wheel to guide the vehicle, and means operable in conjunction with said turning means for shifting the weight of one end of the frame from the normally supporting wheels to the steering wheel as the said steering wheel is turned.

7. In a vehicle, the combination with a frame, of a steering rod mounted therein, a steering element at the lower end of said rod adapted to operate in conjunction with the ground to guide the vehicle, means for turning the said rod, and means for changing the position of the rod longitudinally with respect to the frame as the rod is turned.

8. In a vehicle, the combination with a frame, of a steering rod mounted therein and having at the lower extremity thereof a steering wheel, means for turning the rod, a pair of parallelly disposed rollers carried by the said rod, and a corresponding pair of parallelly disposed rollers carried by the frame, said pairs of rollers being adapted to engage each other to change the position of the rod longitudinally relative to the frame as the rod is turned.

9. In a vehicle, the combination with a frame having supporting wheels, of a steering rod mounted in said frame and having a steering wheel upon the lower extremity thereof, a spring tending to hold the rod in an elevated position in the frame, means for rotating the rod, and interengaging members carried by the rod and the frame whereby as the rod is rotated relative movement longitudinal of the rod is effected between said rod and frame.

10. In a device, the combination with a frame having a plurality of supporting wheels at each end, a steering wheel, means for forcing said steering wheel downwardly against the ground to elevate the supporting wheels at one end of the frame above the ground, and means for turning the steering wheel to guide the vehicle.

11. The combination in a four-wheeled vehicle, of a steering wheel, means for turning said wheel to guide the vehicle in the desired direction, and means for forcing said steering wheel downwardly as it is turned to raise the forward wheels of the vehicle off the ground.

12. In a vehicle, the combination with a frame having supporting wheels, of a steering wheel adapted to operate in conjunction with the ground to guide the vehicle and normally held in an inoperative position, means for bringing the wheel into operative position supporting one end of the frame, means for turning the steering wheel to guide the vehicle, and means whereby as the steering wheel is turned one or other of the wheels supporting the end of the frame opposite that supported by said steering wheel is left free to revolve independent of the other.

13. In a vehicle, the combination with a frame having wheels supporting each end thereof, of driving means for the wheels at the rear of said frame, a steering wheel adapted to operate in conjunction with the ground to guide the vehicle, said steering wheel normally being held in an inoperative position, means for bringing the steering wheel into operative position supporting one end of the frame, means for turning the steering wheel to guide the vehicle, and clutch mechanism interposed between each of said rear wheels and the driving means therefor and operatively connected with said steering wheel whereby one or other of the rear wheels may be released from connection with said driving means.

14. The combination in a vehicle, of a frame, wheels supporting said frame at the rear, driving means for said rear wheels comprising a power shaft, independent shafts each bearing one of said rear wheels, means carried by said power shaft for engaging and disengaging said wheel bearing shafts, means for rotating said power shaft, a plurality of wheels supporting said frame at the front, a steering wheel adapted to be forced downwardly against the ground to raise said forward wheels off the ground, means for turning said steering wheel to direct the vehicle in the desired course, and mechanism interconnecting said power shaft and steering wheel whereby the turning of the latter effects disengagement of one or other of said wheel bearing shafts from said power shaft.

15. In a vehicle, the combination with a frame, of a plurality of wheels supporting the said frame both at the front and the rear, a steering wheel mounted in the frame at the front, means for forcing said steering wheel downwardly against the ground to elevate the forward part of the frame, means for turning the steering wheel to direct the course of the vehicle, driving means for said rear wheels, clutch mechanism on the rear axle whereby one or other of said rear wheels may be released from connection with the driving means therefor, and means interconnecting said clutch mechanism and the steering wheel whereby the turning of the steering wheel to direct the vehicle either to the right or to the left operates said clutch mechanism to throw one or the other of the rear wheels out of engagement with the said driving means.

16. In a vehicle, the combination with a frame, of a plurality of wheels supporting said frame at the front and rear thereof, a steering wheel mounted in the frame adapted to be forced downwardly against the ground to elevate the forward part of the frame, means for turning said wheel to direct the course of the vehicle, an independent rotating shaft for each of said rear wheels, a clutch member carried by each of said axles, a driven shaft, clutch members carried by said shaft and adapted to engage the said clutch members carried by said axles, means permitting shifting of said driven shaft to the right or the left to release one of the clutch members carried thereby from engagement with the corresponding clutch member upon the wheel supporting shaft, and means interconnecting said steering wheel and driven shaft whereby the turning of the steering wheel shifts the shaft.

17. In a vehicle, the combination with a frame, a pair of wheels supporting said frame at the rear, independent shafts journaled in the rear of said frame each carrying one of said rear wheels, a driven shaft extending between said independent wheel bearing shafts, interengaging elements carried by each of said wheel carrying shafts and by said driven shaft, and means for shifting said driven shaft to release from engagement one of the elements carried thereby and the corresponding element carried by one of said wheel bearing shafts, a steering wheel at the front of the frame, and means interconnecting said steering wheel and said driven shaft whereby the turning of said steering wheel shifts said driven shaft.

18. In a vehicle, the combination with a frame, of a pair of wheels supporting said frame at the rear, said rear wheels being carried upon independent hollow shafts journaled in the said frame, a power shaft extending between the two hollow shafts and having the extremities thereof mounted within said shafts, a clutch element carried by each of said hollow shafts, a corresponding clutch element for each of the first-named clutch elements carried by said power shaft, said clutch elements normally lying in engagement with each other, a pair of wheels supporting said frame at the front, a loose collar carried upon said power shaft, a fixed collar on each side of said loose collar, springs interposed between said loose collar and said fixed collars, and means interconnecting said loose collar and said steering wheel whereby the turning of said steering wheel moves the said collar to the right or to the left.

HENRY BARDSLEY.